United States Patent [19]
Teply et al.

[11] Patent Number: 6,003,898
[45] Date of Patent: *Dec. 21, 1999

[54] MAIN BEAM-REAR BEAM JOINT

[75] Inventors: Jan L. Teply, Monroeville, Pa.;
Jonathan Vallis, Aliso Viejo, Calif.

[73] Assignee: Aluminum Company of America, Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/072,083

[22] Filed: May 4, 1998

[51] Int. Cl.$^6$ .................................................. B62D 21/12
[52] U.S. Cl. ......................... 280/785; 280/781; 296/204; 296/203.01; 296/29
[58] Field of Search ..................................... 280/781, 784, 280/785, 797, 798, 799, 800; 296/204, 205, 203.01, 203.03, 203.04, 29, 203.02

[56] References Cited

U.S. PATENT DOCUMENTS

| | | | |
|---|---|---|---|
| 2,711,340 | 5/1955 | Lindsay | 280/781 |
| 4,611,381 | 9/1986 | La Barge et al. | 29/432 |
| 4,618,163 | 10/1986 | Hasler et al. | 280/785 |
| 4,988,230 | 1/1991 | Banthia et al. | 403/170 |
| 5,059,056 | 10/1991 | Banthia et al. | 403/170 |
| 5,094,504 | 3/1992 | Wurl | 296/185 |
| 5,118,102 | 6/1992 | Wurl | 296/204 |
| 5,338,080 | 8/1994 | Janotik et al. | 296/29 |
| 5,372,400 | 12/1994 | Enning et al. | 296/203 |
| 5,435,110 | 7/1995 | Stol et al. | 52/655.1 |
| 5,449,213 | 9/1995 | Kiley et al. | 296/56 |
| 5,480,189 | 1/1996 | Davies et al. | 280/797 |
| 5,480,208 | 1/1996 | Cobes et al. | 296/203 |
| 5,715,643 | 2/1998 | Parkinson | 52/656.9 |

*Primary Examiner*—J. J. Swann
*Assistant Examiner*—James S. McClellan
*Attorney, Agent, or Firm*—Thomas R. Trempus

[57] ABSTRACT

A vehicle frame structure comprises a right side primary longitudinal member and a left side primary longitudinal member, at least two cross beams extending there between that define in combination a ladder like frame having a forward portion and a rearward portion that correspond with the front and rear of a vehicle. Right and left side rocker members are supported in a spaced relationship with respect to the right and left side primary longitudinal members. A "C" node is disposed between adjacent primary members and rocker members. Right side and left side rear beams have a forward end and an opposed rearward end, an upper surface and an opposed lower surface, and an inwardly facing surface and an opposed outwardly facing surface. Each of the right and left side rear beams are in mechanical communication with its respective right and left side primary longitudinal member and disposed respectively between the right and left side rocker members and the ladder like frame, extending aft of, and in an cantilevered fashion from, the "C" node.

10 Claims, 10 Drawing Sheets

MAIN BEAM-REAR BEAM JOINT

FIELD OF THE INVENTION

The invention relates to a structural component that is an element in a body in white. More particularly, the invention is a unique structural component in the form of a main beam-rear beam integral joint.

BACKGROUND OF THE INVENTION

Societal demands for greater automotive fuel economy, lower environmental impact, and enhanced vehicle performance have resulted in significant, industry-wide efforts to improve vehicle and fleet fuel economies. One area in which significant further gains in vehicle and fleet fuel economies can be realized is vehicle lightweighting. A number of vehicle lightweighting options have been devised and implemented. The vast majority of these options are based on material substitutions. In particular, there is a substantial and growing trend toward the use of aluminum alloys to replace ferrous metals in a variety of automotive components. While material substitutions of aluminum in place of steel have yielded significant reductions in vehicle mass, they have failed to fully exploit the potential of aluminum for vehicle weight reduction. This potential can be far more fully realized by the use of aluminum for the primary structure of the vehicle.

Presently, in the automotive industry, the primary method employed for vehicle body construction is the traditional sheet metal monocoque (or "unibody") structure. It is in virtually universal use in the automotive industry today. However, other design and construction approaches exist. One such alternative is the frame-on-body approach that is exemplified by the Chrysler Plymouth Prowler. Here, the vehicle body is mounted onto a separate structural frame that supports the engine, power train, and suspension components. In this type of design, the structural role of the body is much less than in the unibody class of designs.

On the design/construction spectrum at one end of which is the unibody approach there is at the other end, the multi-product aluminum space frame approach. In a space frame, the structure of the body consists of a number of extruded beams, joined together at nodes made from a variety of aluminum product forms. A multi-product aluminum space frame structure is shown in U.S. Pat. No. 4,618,163, entitled "Automotive Chassis", the contents of which are incorporated by reference as if fully set forth herein. The structural truss which results from a space frame structure is then covered with a largely non-structural sheet-product skin to create the finished vehicle body.

The space frame approach yields a number of benefits to manufacturers, consumers, and society at large. These benefits include the reduced weight of the vehicle, the environmental benefits obtained through reduced fuel consumption and lower vehicle emissions, and the proven and commercially viable recyclability of aluminum parts.

The aluminum space frame vehicle structure is more versatile than the steel unibody counterpart. For example, a single frame design can be produced, with little or no modification, and function as a passenger car, a minivan, a sport utility vehicle, or light truck. The space frame structure permits the separation of the frame structure from the styling and passenger or load bearing configuration of the vehicle. This is possible because the external appearance of the vehicle can be altered without altering the internal structural frame.

It is the current practice to construct aluminum space frame vehicle structures of extruded members which are joined by welding to separately manufactured nodes. This assembly process requires fit-up and joining of a number of different product forms, e.g., castings, extrusions, stamped sheet, etc., of complex shape and often widely desperate sizes. Because the aluminum components are far more stiff than the sheet steel parts used for traditional unibody vehicles, they require "fit-up" forces far greater than those needed for sheet metal parts. The force levels required during assembly commonly exceed the capabilities of conventional automotive assembly fixtures. So, the geometric tolerances of the aluminum parts must be controlled much more closely than those of conventional sheet steel parts. Such tolerances are not always entirely compatible with existing part manufacturing processes, and aluminum parts may require machining and forming prior to assembly. The high structural stiffness of the components being joined, moreover, leads to difficult tolerance stack-ups at the joints, so that a joint gaps and locations may vary somewhat from one assembly to the next.

It is therefore an object of the instant invention to promote the widespread use of the aluminum space frame vehicle structure concept, and elements thereof, through the use of innovative aluminum frame vehicle structure designs.

It is another object of this invention to mitigate or eliminate the manufactureability issues associated with current aluminum frame vehicle structures.

It is yet another object of this invention to eliminate the separate node components which characterize the current generation aluminum space frame vehicle structures and in their place utilize an integral node made of nested extrusions and/or pocketed joints.

It is here again another objective of this invention to address joint location and gap control in a space frame style body-in-white structure and to provide a design structure that provides a built-in allowance for the tolerance stack-up interferences that inevitably develops at the joints.

It is still a further object of this invention to facilitate and enable the high speed, mass production of aluminum frame vehicle structures.

SUMMARY OF THE INVENTION

The invention provides a vehicle frame structure that can be employed in a conjunction with a ladder frame or a body-in-white space frame structure. This vehicle frame structure comprises a right side primary longitudinal member and a left side primary longitudinal member. At least two cross beams extend there between, defining in combination with the right and left side primary longitudinal members a ladder like frame. The ladder frame has a forward portion and a rearward portion that correspond with the front and rear of a vehicle. The structure also includes right and left side rocker members supported in a spaced relationship with respect to the right and left side primary longitudinal members. Each of the primary longitudinal members has a forward end and an opposed rearward end, an upper surface and an opposed lower surface, and an inwardly facing surface and an opposed outwardly facing surface. Right side and left side rear main beams have a forward end and an opposed rearward end, an upper surface and an opposed lower surface, and an inwardly facing surface and an opposed outwardly facing surface. Each rear beam also includes a pair of opposed shoulders that extend along at least a portion of the side surfaces near the forward end of the rear beam. Each of the right and left side rear beams is in mechanical communication with its respective right and left side primary longitudinal member and disposed respectively between the right and left side rocker members and the ladder like frame. Each rear beam is slidably received in a "C" node which engages the shoulder portion of the rear beam. The rear main beams extend aft of, and in an cantilevered fashion from, the ladder frame's rearward portion. The "C" node structure is joined between the main beams and the rocker members.

The structure of this invention is particularly well suited for use in combination with a body-in-white space frame structure. A space frame with a right side primary longitudinal member and a left side primary longitudinal member can incorporate the node and rear beam suspension supporting structure of this invention. A space frame can be understood to define the body-in-white in which the sheet metal or outer skin of the vehicle are hang-on components that typically do not act as structural elements of the vehicle's frame structure.

BRIEF DESCRIPTION OF THE DRAWINGS

The above as well as other features and advantages of the present invention will be more fully appreciated through consideration of the detailed description of the preferred embodiment in conjunction with the several figures in which.

DETAILED DESCRIPTION OF THE INVENTION

Figure 1:
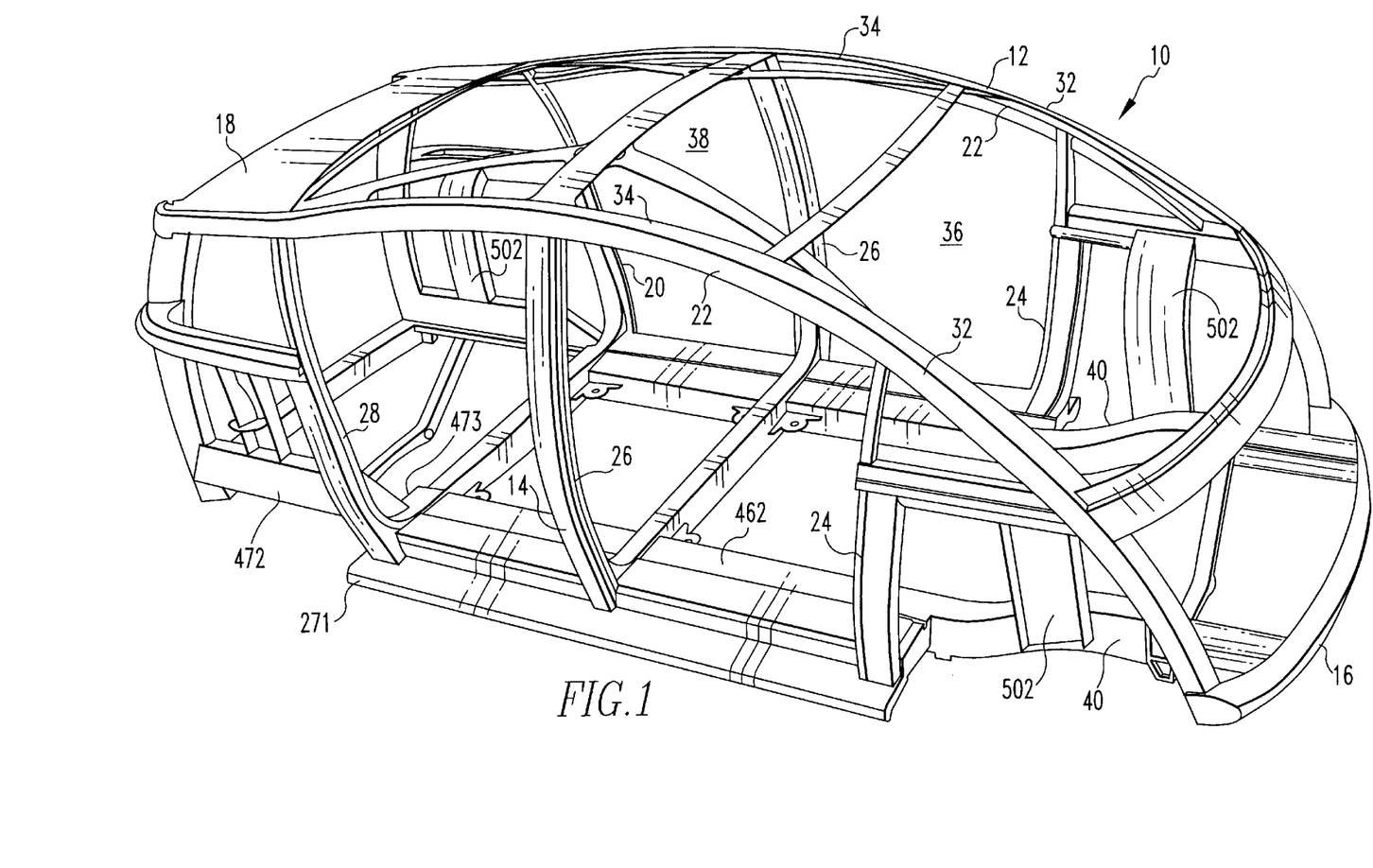
FIG. 1 is an aluminum space frame vehicle structure which incorporates integral nodes made of nested extrusions and/or pocketed joints.
Figure 2:
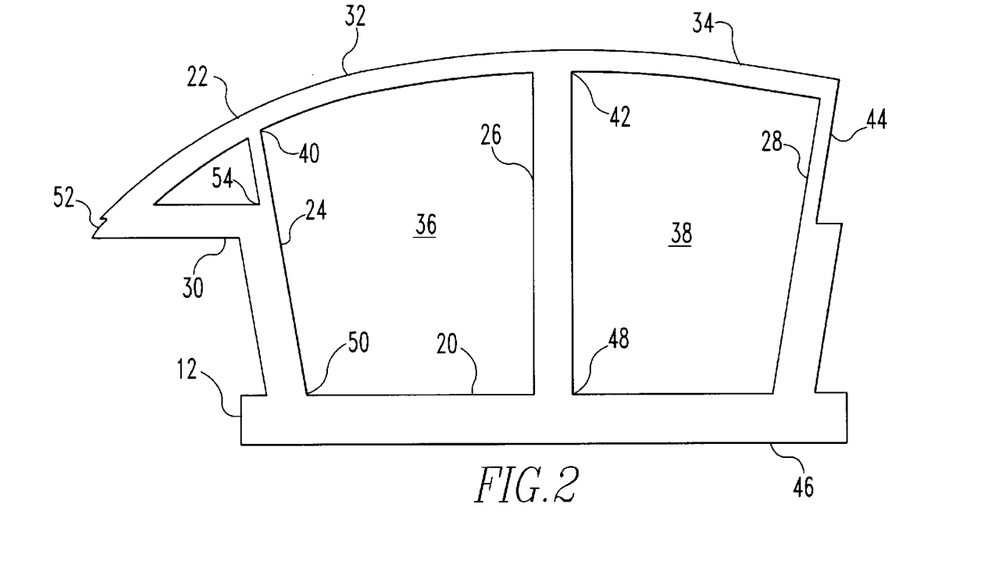
FIG. 2 is a schematic representation of the side wall of the space frame structure shown in FIG. 1 consisting of six extrusions, the rocker rail, the A, B, and C-posts, the roof rail, and the window quarter rail.

A space frame structure incorporating the features of this invention is shown in FIG. 1 and generally indicated by the reference character 10. The space frame structure 10 includes a left side or driver side 12, a right side or passenger side 14, a front end 16, and a rear end 18, as well as a roof and underbody. A side wall 12 (i.e., as per either of elements 12 or 14 of FIG. 1) is shown in FIG. 2. The side wall 12 comprises a rocker rail 20 at the lower portion thereof and a roof rail 22 in the uppermost portion of the side wall 12. Extending between the roof rail 22 and the rocker rail 20 are an A-post 24, a B-post 26, and a C-post 28. Additionally shown in the configuration of this space frame structure is a window quarter rail 30. The roof rail 22 includes a first portion 32 extending between the A-post 24 and the B-post 26 and a farther portion 34 extending between the B-post 26 and the C-post 28. The combination of the A, B, and C-posts in conjunction with the roof rail 22 and the rocker rail 20 defines front and rear door openings 36 and 38 respectively.

The side wall 12 as shown in FIG. 2 as well as the entire space frame structure illustrated in FIG. 1 includes a plurality of slide-in slip joints "integral" nodes that are generally indicated by the evenly numbered reference characters 40 through 54. It is to be appreciated that while only certain integral nodes are shown in FIG. 2, virtually every joint seen in the space frame structure of FIG. 1 can be produced as an integral node according to the teachings of this invention.

Figure 3A:
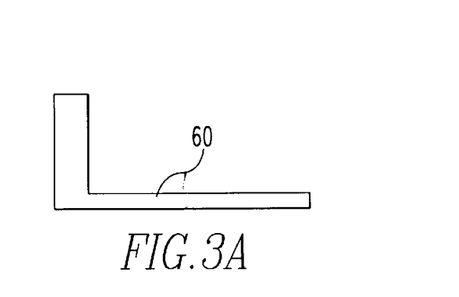
FIGS. 3A, 3B, and 3C are cross-sectional representations illustrating the definitional terms associated with the extrusions used in the design and assembly of a space frame vehicle in accordance with the teachings of this invention.
Figure 3B:
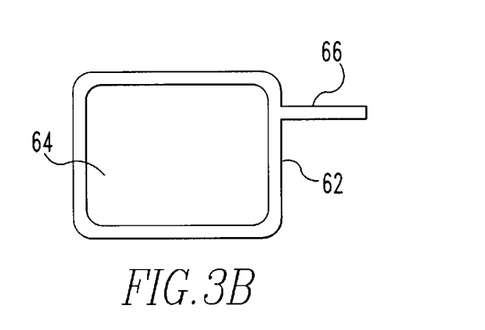
Figure 3C:
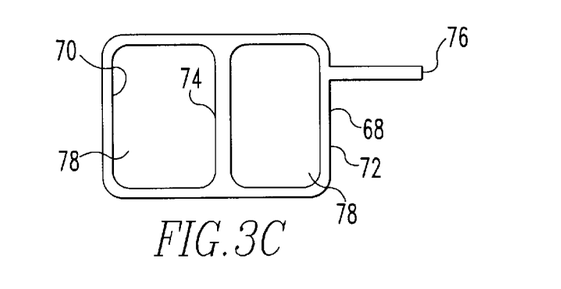

Turning to FIGS. 3A, 3B, and 3C, there are illustrated three cross-sections of extrusions that can be utilized in the space frame structure of FIG. 1. These extrusions are presented for illustrative purposes so as to facilitate an understanding of some of the features of the preferred embodiment of the invention that is described herein below. FIG. 3A shows the cross-section of extrusion 60 that is typically identified in the industry as being a solid extrusion. By solid it is meant that no internal voids are defined by the boundaries of the extrusion 60. FIG. 3B shows an extrusion 62 which is known as a hollow extrusion because a void, as at 64, is defined within the extrusion. This extrusion 62 also includes a flange 66 extending from one side wall thereof It is to be appreciated that any number of flanges such as the flange 66 can be incorporated into a solid or hollow extrusion. Finally, FIG. 3C shows a hollow extrusion typically identified as a "two void hollow." This extrusion 68 includes an inner wall 70, an outside (or right hand side) wall 72, an internal rib 74, and a flange 76 extending from the outside wall 72. Two voids 78 are defined by the combination of the inside (or left hand side) wall 70 and the internal rib 74 of the extrusion 68. An alternative form of the structural elements of this invention can be a roll formed, sheet product. It is to be appreciated that a roll formed sheet product, a stamped sheet product, or an extrusion may be utilized in the structure of this invention. The preference of one product form, i.e., a sheet or extrusion, over the other is a function of the cost and design preferences that are required in a given structure. Either product form may be utilized in conjunction with the teachings of this invention to produce the space-frame that enjoys the advantages of the structure described herein.

In the design and assembly of an aluminum body-in-white, the issues posed by variability in joint location and gap size are exacerbated by the thin sections of the components being joined. The components being joined may have wall thicknesses of several millimeters of less, which means that the weld beads must be relatively narrow. Thus, variability in joint location and gap cannot be compensated for by simply overpowering the joint with a weld bead large enough to cover a range of joint dimensional parameters. A narrow weld bead must be placed at the appropriate location, or weld quality and structural durability will suffer. Use of inordinately large weld beads, moreover, can lead to high thermal stresses at the joint producing distortion in the finished assembly. The several joint embodiments described in detail below present solutions to the foregoing design and assembly challenges.

Rocker—Pillar Joints

Figure 4:
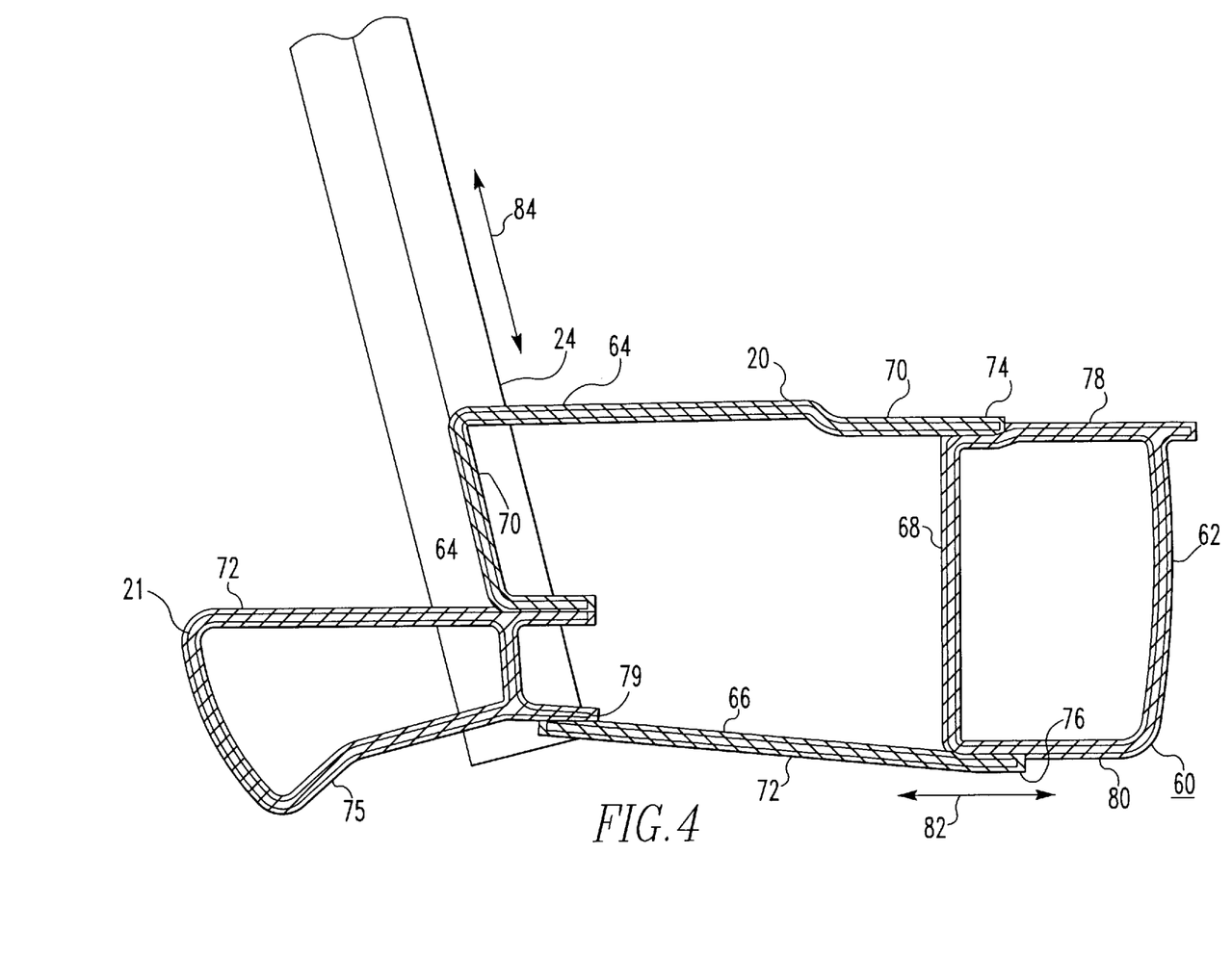
FIG. 4 is an embodiment of the rocker-pillar joint shown in cross-section.
Figure 6:
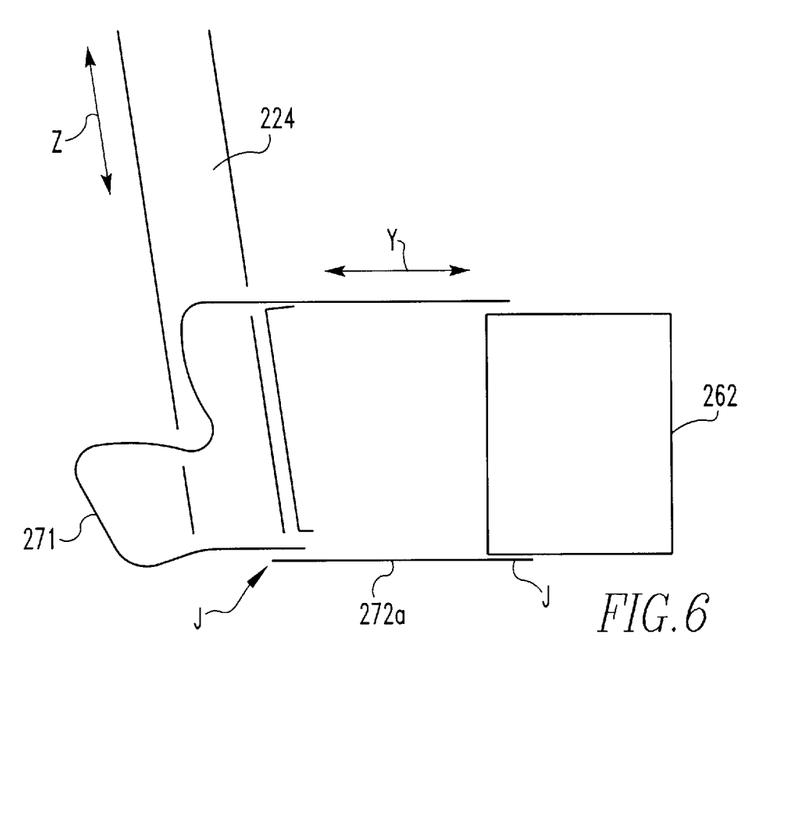
FIG. 6 is a detailed, cross sectional, fragmentary view of a rocker-pillar joint assembly.
Figure 7:
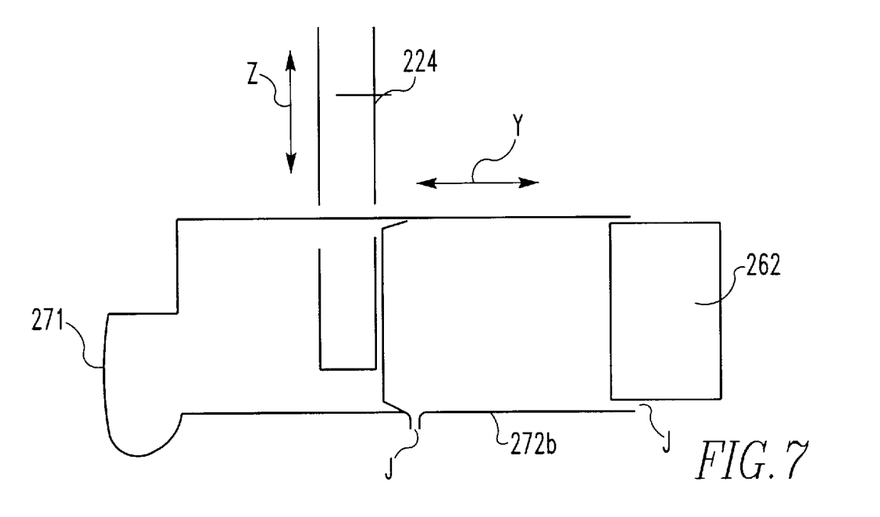
FIG. 7 is a detailed, cross sectional, fragmentary view of an alternative rocker-pillar joint assembly.

Turning to FIGS. 4, 6, and 7 there is shown the detail of the integral node or joint wherein a post or hinge-pillar, such as for example, an A-post, B-post, C-post, or D-post is connected to the rocker assembly. The integral node or joint configuration facilitates adjustment or "manufacturing slip" along the Z-axis and along the Y-axis of a body-in-white during the assembly process. As shown specifically in FIG. 4, the rocker assembly generally indicated by the reference character 60 includes the rocker rail 20, a rocker step member 21, and a main beam 62. The components of this slip-joint structure can be produced from extruded or sheet product forms. As a general overview of the assembly process, the pillar 24 is adapted to be slidably received into a machined cut-out as at 64 in the rocker step member 21. "Z" axis positioning as at 84 of the pillar relative to the rocker step member 21 is established. The rocker rail 20 is joined at one end as at 65 to the rocker step member and at the other end as at 74 to the main beam 62 so as to permit "Y" (as at 82) axis positioning of the pillar 24 relative to the main beam 62. The Y axis positioning is facilitated by the movement of the rocker rail 20 relative to the main beam 62. When the desired relative positioning of the components is achieved, the parts are joined. The joining operation may consist of the use of adhesives, mechanical fasteners, brazing, welding or a combination thereof At this point in the assembly process, a closure plate 72 has not yet been mounted between the rocker step member 21 underside 75 and the main beam 62 bottom portion 80. Upon completion of the joining process, the closure plate 72 is attached between the rocker step member 21, flange 79, and the bottom 80 of the main beam 62, thus defining a beam or box-like structure in combination with the rocker rail 20, the rocker step 21 and the side 68 of the main beam 62.

As can be appreciated, the main beam 62 and the rocker rail step 21 are slidable one with respect to the other to permit adjustment in the Y-axis. Accordingly, manufacturability is improved through the flexibility of the alignment of the rocker rail 20, and the rocker step member 21, with respect to the main beam 62.

Figure 5:
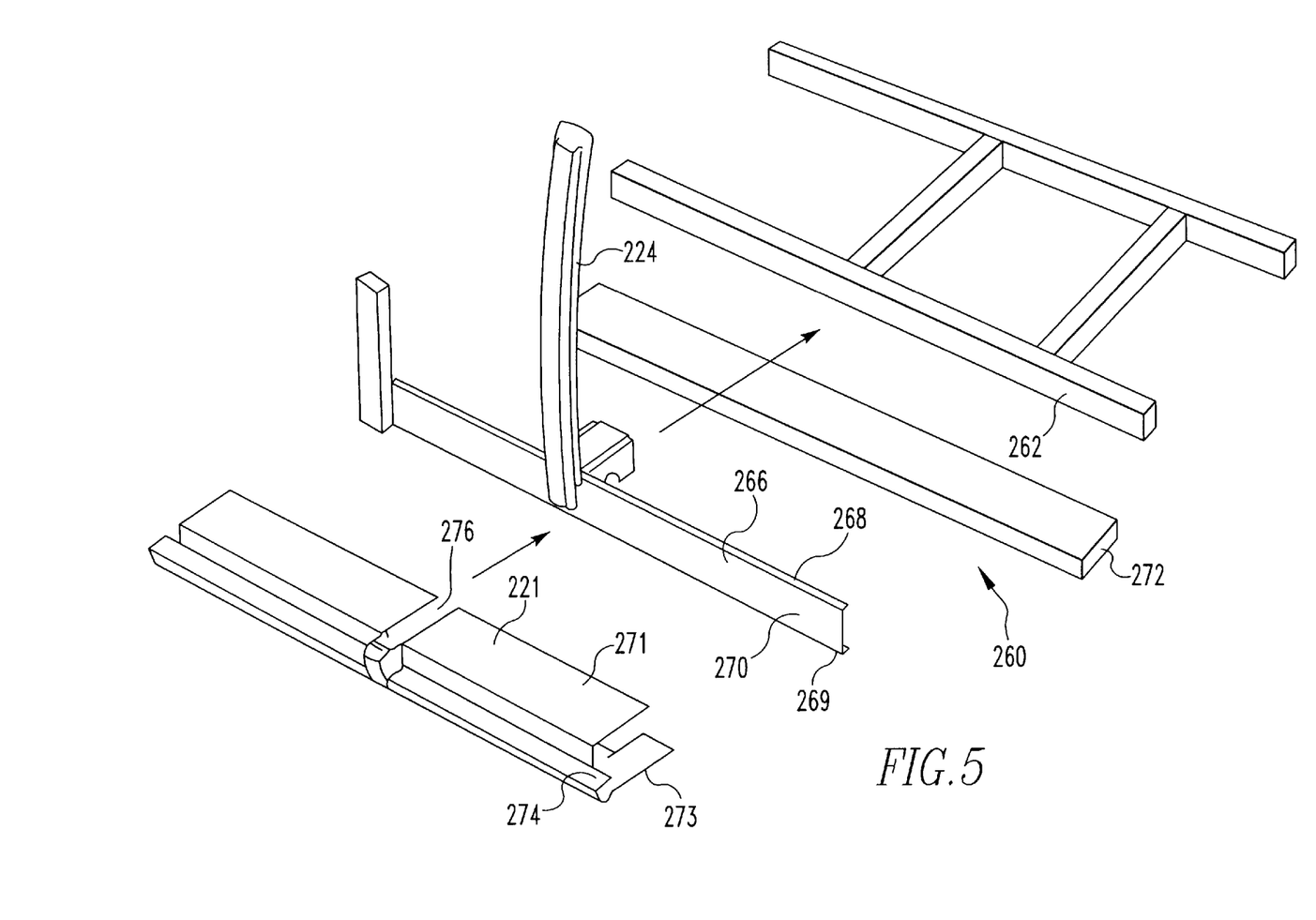
FIG. 5 is an exploded view of a rocker-pillar joint.

The joint assembly includes the pillar member 24 which is vertically disposed with respect to the body-in-white (see FIG. 1) and has opposed upper and lower ends, an outwardly facing portion, an inwardly facing portion, and opposed side walls extending therein between. The assembly also includes a main beam structure 62 that is generally longitudinally disposed with respect to the body-in-white. The beam may, for example, be a longitudinal element in a ladder frame as shown in FIG. 5 and may define an assembly reference point in the body-in-white. In one embodiment, a first rocker step member 21 defines an upper portion 73 and at least one side wall 77 extending therefrom. The rocker member upper portion defines an opening therein (as at 64) adapted to receive there through the pillar member 24 lower end. The pillar member is adapted to cooperate with the first rocker step member 21 to permit relative Z-axis (84) positioning there between. The rocker member 20 upper portion 74 is adapted to slidably engage the main beam structure upper portion 80 in order to permit relative Y-axis (82) positioning there between. In this arrangement, the main beam structure outwardly facing side wall 68 extends between said rocker member upper portion and the subsequently attached closure member 72.

In FIG. 5, there is shown an exploded view of an embodiment of the rocker to pillar joints in which the several components are manufactured from a sheet product. The rocker assembly is generally indicated by the reference character 260. The rocker assembly is adapted to mount onto a main beam 262. The pillar 224 is supported on first rocker member 266 having an inside wall 268 and an outside wall 270. The member 266 provides a central support for the upper and lower portions 271 and 273 of the rocker 221. As can be appreciated through consideration of the exploded view of this figure, the pillar 224 can be adjusted in a Z-slip manner to facilitate the manufacture of the side of a vehicle.

The assembly includes a second rocker member 221 defining an upper portion 271, a lower portion 273, and at least one side wall 274 extending therein between, wherein the second rocker member 221 upper portion 271 defines an opening therein 276 adapted to receive there through and substantially surround the pillar member 224 lower end. As shown in FIG. 5, upon the completion of the assembly and the joining process, a closure plate 272 is mounted between the bottom of the second rocker rail, the bottom flange 269 of the first rocker rail 270 and the main beam 262. Both the first rocker member 266 and the second rocker member 221, as well as the main beam 262 and pillar 224, may be formed from either extrusions or sheet product that is stamped or roll formed. For example, the rocker member 221 may be formed from a hollow extrusion having a pair of flanges extending from one side thereof The flanges define attachment points adapted to cooperate with the main beam 262 upper and lower portions so that the first rocker member is slidably movable relative to the main beam prior to final attachment thereto. Attachment can be completed through welding, adhesive bonding, mechanical attachment, or any combination thereof Additionally, in the stamped sheet product alternative embodiment of this figure, the rocker 221 can define by means of an open portion as at 275 (FIG. 6) a channel in which the vehicle's exhaust system type may be mounted.

In the schematic view of FIGS. 6 and 7, alternative configurations of the closure panel 272a and 272b are illustrated. The post 224 is aligned to the rocker 271 and jointed to the beam 262. The closure panel 272a (272b) is joined between the rocker 271 and the beam 262 as indicated by the reference character "J".

Roof Rail—Pillar Joints

Figure 8:
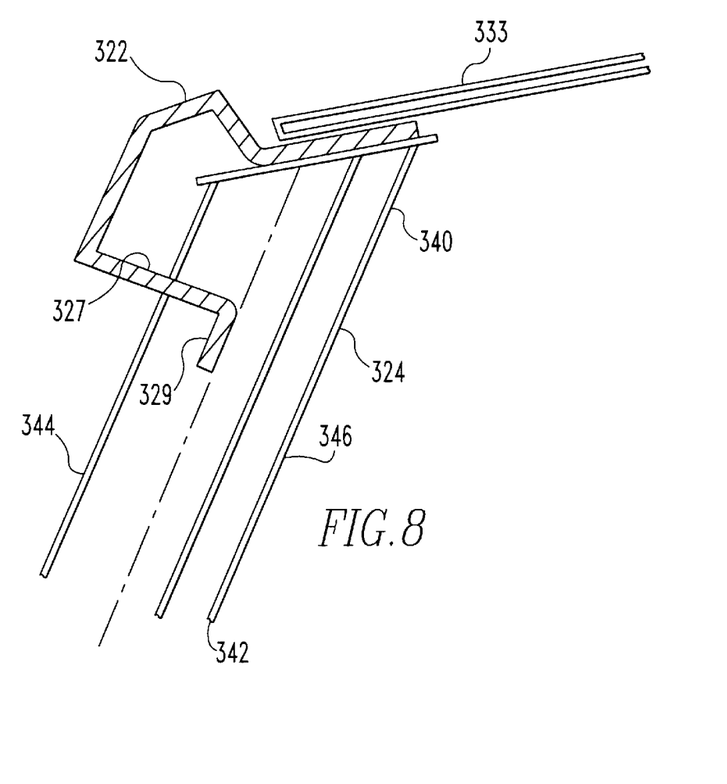
FIG. 8 is a pillar-roof rail joint.
Figure 9A:
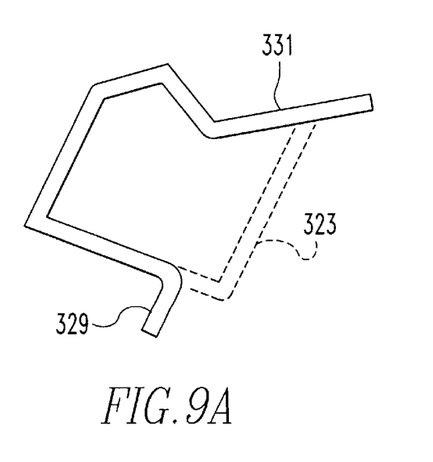
FIGS. 9A and 9B are alternative embodiments formed from an extrusion and a sheet product form respectively.
Figure 9B:
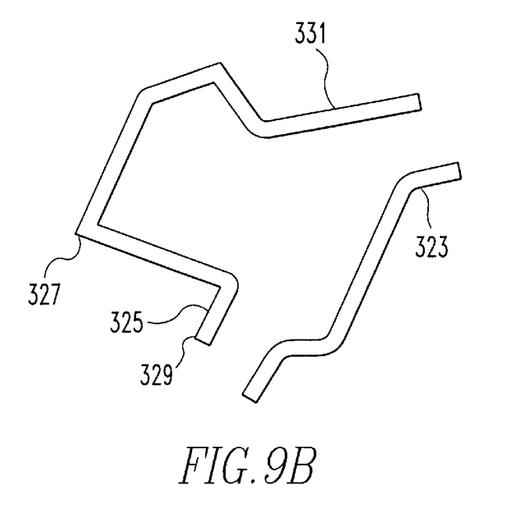

The joint configuration of this invention facilitates adjustment along at least the Z-axis of a body-in-white during the assembly process. More particularly, the joint comprises a vertically disposed pillar, such as, for example, the B-pillar 324 (Element 26 of FIG. 1), that is attached to the roof rail 322 (Element 22 of FIG. 1). Turning to FIGS. 8, 9A, and 9B, there is shown a joint mechanism in which the upper end of a B-pillar 324 is attached to the roof rail 322 of a vehicle side structure. The roof rail can consist of an extrusion (as in FIG. 9A) with a portion cut out (shown in phantom) therefrom to facilitate the insertion of a pillar into it. Alternatively, the roof rail can be formed from a two-piece system (as in FIG. 9B) of sheet. The two-piece sheet product can be formed from roll forming or sheet stamping. In either case, the roof rail includes a first portion 321 and a second portion 323. The roof rail 322 defines an opening as at 327 through which the pillar is inserted. This arrangement permits the relative sliding motion of the pillar with respect to the roof rail. This sliding freedom in the Z-axis direction permits adjustment of the component relationship in the assembly of a frame. In either the use of a hollow extrusion or a multi-piece sheet product form, surfaces are provided as at 329 that function as locations for weldments to attach the B-pillar to the roof rail. Additionally, the cross section of the roof rail can be adapted as at 331 to define a seat onto which the roof outer skin 333 may be attached.

More specifically, the joint assembly includes a pillar member 324 vertically disposed with respect to the body-in-white. The pillar member 324 has opposed upper 340 and lower 342 ends, an outwardly facing portion 344, an inwardly facing portion 346, and opposed side walls extending therein between. A roof rail structure 322 is generally horizontally disposed with respect to the pillar member. The roof rail structure consists of at least one elongated member having outwardly and inwardly facing opposed side walls 348 and 350, an upper wall, and a lower wall. The lower wall defines an opening 327 adapted to slidably receive therein the pillar member's upper end. This relationship facilitates the adjustment of the Z-axis location of the pillar with respect to the roof rail. The roof rail can also include means as at 350 for facilitating the attachment of the pillar member upper end 340. The pillar member is formed from extrusion or from sheet metal products. The roof rail structure is formed from at least one extrusion or from sheet product. The elongated member of said roof rail structure may comprise an outer piece and an inner piece. These pieces may be either, for example, sheet product or extruded product that are attached by welding, bonding, or similar techniques.

The roof rail structure outer piece (as in FIG. 9B) defines the opening adapted to slidably receive therein the pillar member's upper end. The outer piece can also include an upper region adapted to support a vehicle roof structure. The pillar member can include a flange extending from at least of one of the opposed side walls and the roof rail structure lower wall can include a flange extending downwardly therefrom. These two flanges cooperate to provide attachment surfaces for completing the joint.

The invention also provides a method for forming a roof rail—pillar joint assembly for a body-in-white. The steps of the method include providing a pillar member having opposed upper and lower ends, an outwardly facing portion, an inwardly facing portion, and opposed side walls extending therein between. A roof rail structure is provided and it is generally perpendicular with respect to the pillar member. The roof rail structure consists of at least one elongated member having outwardly and inwardly facing opposed side walls, an upper wall, and a lower wall. The lower wall defines an opening adapted to slidably receive therein the pillar member's upper end and facilitates its relative positioning along at least one axis therein between. The relative movement permits Z-axis alignment of the pillar with respect to the roof rail.

Main Beam—Rear Beam Integral Joint

Figure 10:
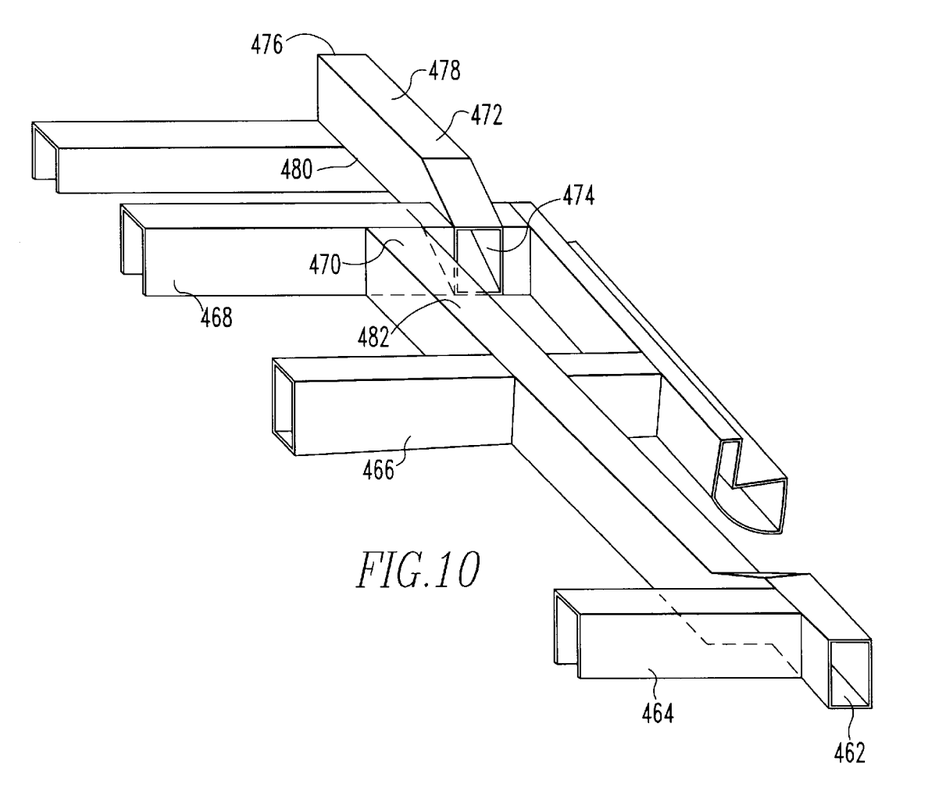
FIG. 10 is a view of the driver's side or left rear portion of a body-in-white, ladder frame structure incorporating a main beam-rear beam structure, with portions cut away.
Figure 11A:
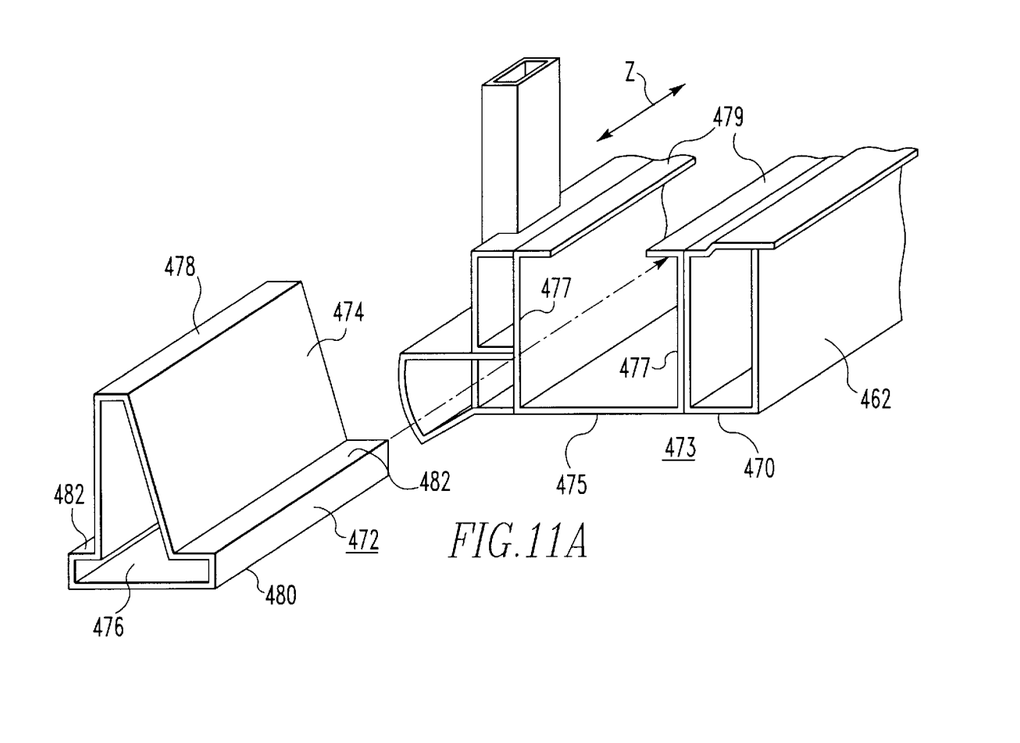
FIGS. 11A and 11B are schematic views of details of the main beam-rear beam structure.
Figure 11B:
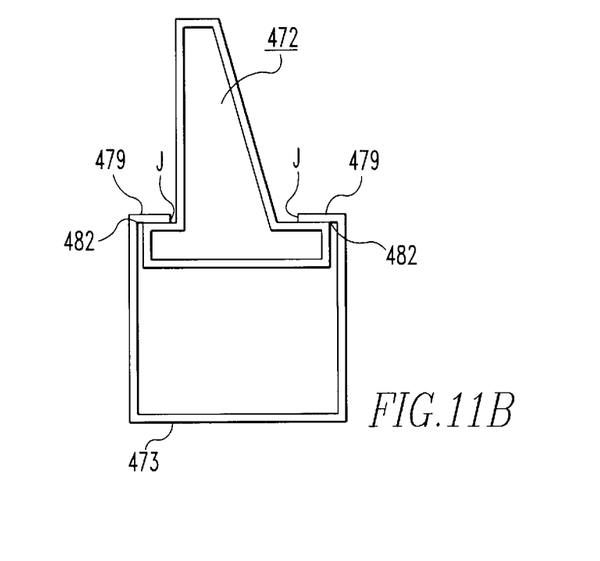

The invention provides a vehicle frame structure that can be employed in a conjunction with a ladder frame or a body-in-white space frame structure. In FIGS. 10 and 11, there is shown the two-piece structure of the main beam-rear beam integral joint. The main beam generally indicated by the reference character 462 defines in part a ladder frame like structure in combination with its opposite member which is not shown and front cross beam 464, B-pillar cross beam 466, and C-pillar cross beam 468. The main beam was previously discussed in conjunction with the attachment of a rocker panel in FIGS. 4 through 6. In order to facilitate the Y-axis alignment of a frame structure, the main beam 462 rear portion as at 470 is adapted to receive thereon a rear main beam segment 472 by means of a "C" node 473. The rear beam segment 472 has a forward portion 474, a rear portion 476, an upper portion 478, and a lower portion 480. Above the bottom portion 480 is a shoulder portion 482 that is adapted to cooperate with the "C" node 473. The "C" node 473 has a bottom portion 475, opposed side walls 477 that terminate in inwardly facing shoulder portion 479. The "C" node 473 is disposed between the main beam 462 and the rocker member 271 (of FIG. 1). Appropriate joining methodologies are used to retain the "C" node in this position. The rear beam 472 is slidably received into the "C" node so that the shoulder portions 482 of the rear beam engage the spaced apart shoulder portion 479 of the "C" node. "Z" axis adjustment of the rear beam relative to the main beam is possible prior to joining as at "J" in FIG. 11B. The slidable relationship of the rear main beam 472 in conjunction with the main beam 462 provides an independent mechanism on both the right and left halves of the vehicle assembly to ensure that both sides of the vehicle meet manufacturing dimensions and tolerances. Additionally, the use of a rear main beam portion and a front main beam portion permits the offset of one beam with respect to the other by use of the "C" nodes 473. Thus, the rear main beam 478 is moveable in a Y-axis direction with respect to the body in white as well as a X-axis direction to adjust the width of the rear main beam support structures relative to each other. More specifically, the vehicle frame structure comprises a right side primary longitudinal member and a left side primary longitudinal member. At least two cross beams extend there between, defining in combination with the right and left side primary longitudinal members a ladder like frame. The ladder frame has a forward portion and a rearward portion that correspond with the front and rear of a vehicle. The structure also includes right and left side rocker members supported in a spaced relationship with respect to the right and left side primary longitudinal members. Each of the primary longitudinal members has a forward end and an opposed rearward end, an upper surface and an opposed lower surface, and an inwardly facing surface and an opposed outwardly facing surface. Right side and left side rear main beams have a forward end and an opposed rearward end, an upper surface and an opposed lower surface, and an inwardly facing surface and an opposed outwardly facing surface and shoulder portions extending from said lower surface. Each of the right and left side rear main beams is in mechanical communication with its respective right and left side primary longitudinal member and disposed respectively between the right and left side rocker members and the ladder like frame by means of "C" nodes. The rear main beams extend aft of, and in an cantilevered fashion from, the ladder frame's rearward portion. The "C" node is mounted between the primary beams and the rocker members.

The ladder frame can also include an integral greenhouse structure which substantially defines a vehicle passenger compartment. All of the elements that form the vehicle frame structure of this invention can be formed from sheet or extruded product. Preferably, the product is an aluminum product form.

The integral node structure of this invention is particularly well suited for use in combination with a body-in-white space frame structure. A space frame with a right side primary longitudinal member and a left side primary longitudinal member can incorporate the node—main rear beam suspension supporting structure of this invention. A space frame can be understood to define the body-in-white in which the sheet metal or outer skin of the vehicle are hang-on components that typically do not act as structural elements of the vehicle's frame structure.

Strut Tower

An improved strut tower for the support of suspension components comprises an elongated member having an upper end attachment point, a lower end attachment point and a shoulder portion therein between. The shoulder portion includes means adapted to support a suspension component, such as a strut or spring. As can be seen in FIG. 1 in conjunction with FIGS. 12 and 13, a pair of strut towers generally indicated by the reference character 502 are provided on the right and left hand sides of the vehicle. The strut tower 502 includes a structural member 504 having a lower attachment point 506 and an upper attachment point 508. It is to be noted that the attachment points are adapted to cooperate with the structure of the body in white. Specifically, the upper attachment point 508 is attachable to the window quarter rail 30 and the lower attachment point 506 is attachable to the S-rail 41. It is to be appreciated that other body-in-white structures can utilize the strut of this invention. The S-rail 40 can be a part of the main beam. The curved or shoulder portion 510 of the strut tower 502 provides the Y-axis clearance necessary to mount a wheel within the frame structure of the body in white. Because the attachment point is provided through the S-curve portion on opposite faces of the strut tower, the strut tower is moveable in both the Z-axis and X-axis with respect to the body in white. Accordingly, minor assembly corrections can be made to the alignment of the vehicle through the placement of the strut towers within the body in white. The strut towers are preferably manufactured from an extruded member that is subsequently subject to a bending process. The upper end attachment point and the lower end attachment point are offset with respect to each other by means of the shoulder portion 510. This provides a strut tower with an elongated generally vertical section and a preferably shorter, somewhat horizontally disposed, section that are connected by a curved shoulder portion 510.

Figure 12:
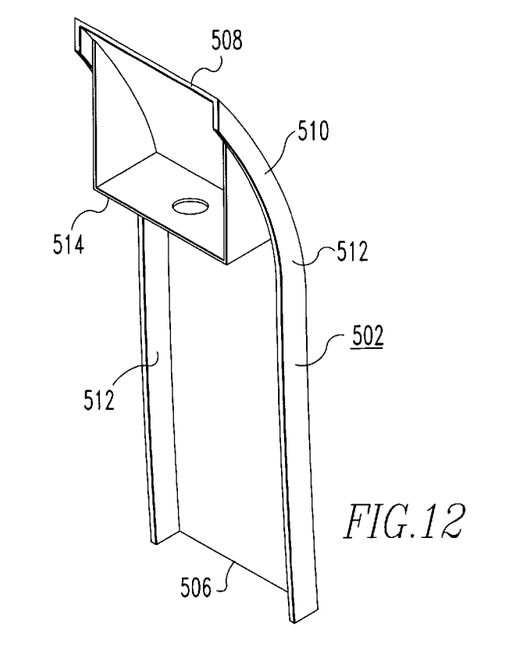
FIG. 12 is a perspective view of a strut tower according to this invention.
Figure 13:
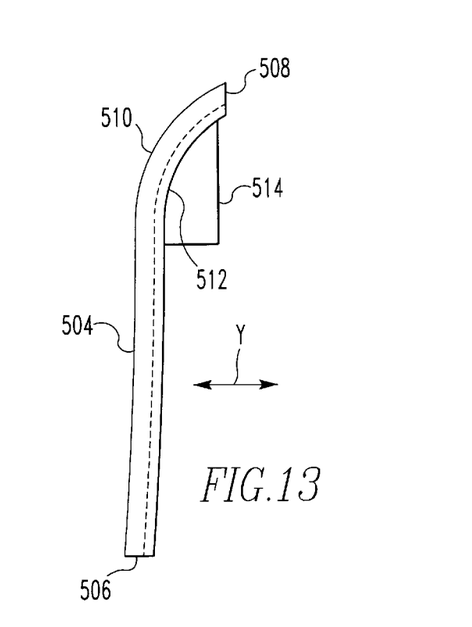
FIG. 13 is a side elevational view of the strut tower of FIG. 12.

The shoulder portion may include an integral mounting device 514 formed or mounted therein. The strut tower's elongated member includes an inwardly facing portion and an opposed outwardly facing portion, and at least one rib member extending from said inwardly facing portion. Preferably, the inwardly facing portion includes two or more such ribs 512. The ribs may be located proximate the opposed edges of the strut tower and extend inwardly along the length of the elongated member. The extruded product from which the elongated member is produced may be a solid extrusion having at least one, and preferably two or more, integral flanges therein.

The invention may be manufactured as a separate component that is ultimately employed in combination with a body-in-white of a space frame type of structure, although the strut tower is not limited to the space frame vehicle. Additionally, while the strut tower has been described primarily in conjunction with the front wheels of a vehicle, it is to be appreciated as shown in the several figures that the extruded strut tower of this invention may be employed in conjunction with the rear wheels of a vehicle. Fundamentally, to the extent that the body-in-white has a first longitudinal member disposed at a first elevation and a second longitudinal member disposed at a second elevation and offset laterally with respect to the first longitudinal member, the extruded strut tower of this invention may be utilized in either the front or rear suspension systems of a vehicle.

Cross Beam—Main Beam Joint

Figure 14:
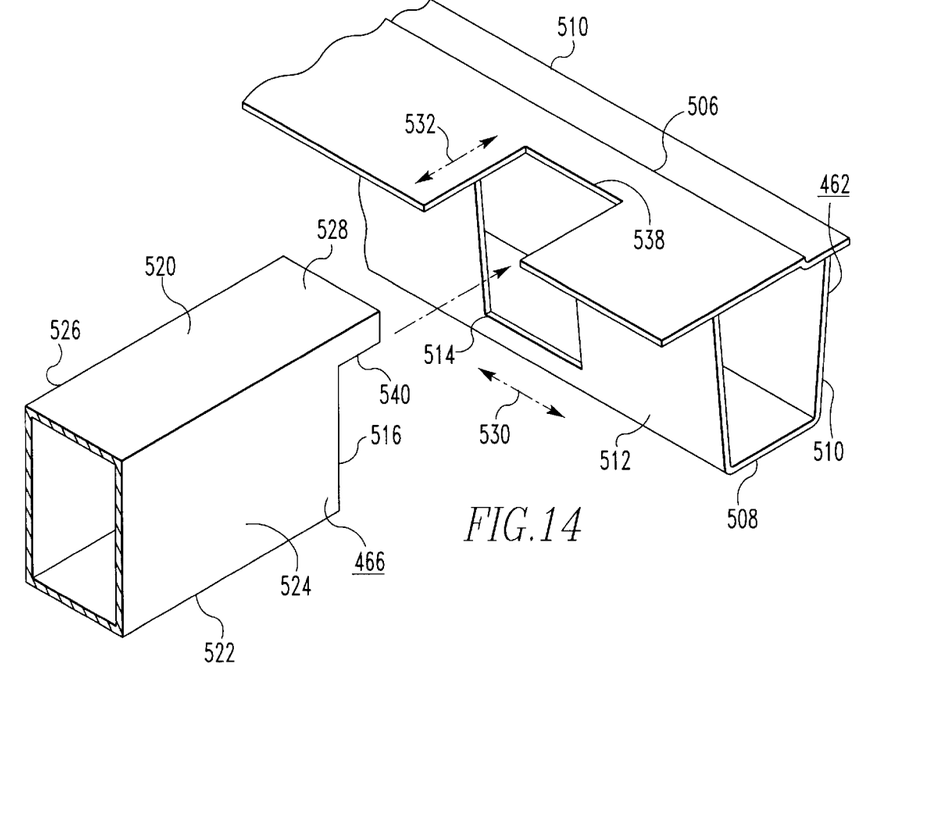
FIG. 14 is an exploded view of a cross beam-main beam joint.
Figure 15:
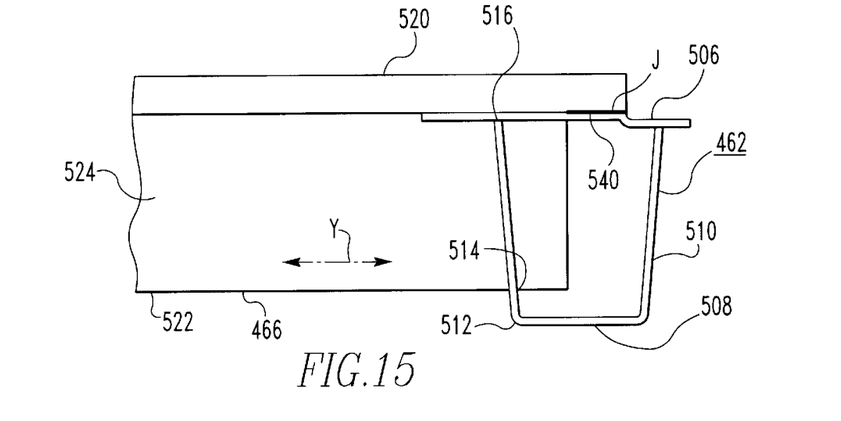
FIG. 15 is a detailed view of a cross beam-main beam joint.

The invention provides a vehicle frame joint structure that can be used in a conjunction with a ladder frame or a body-in-white space frame structure. In FIGS. 10, 14, and 15, there is shown the cross beam—main beam integral joint. The main beam generally indicated by the reference character 462 defines in part a ladder frame like structure in combination with its opposite member which is not shown and front cross beam 464, B-pillar cross beam 466, and C-pillar cross beam 468. The main beam segment has a forward portion 502, a rear portion 504, an upper portion 506, a lower portion 508, and opposed side walls 510 and 512. The slidable relationship of the cross beam relative to the main beam 462 provides an independent mechanism on both the right and left halves of the vehicle assembly to ensure that both sides of the vehicle meet manufacturing dimensions and tolerances.

An exploded view of an assembly detail of the cross beam—main beam joint is shown in FIG. 14. This integral joint includes a female portion generally indicated at 514 and a male component generally indicated at 516. In preparing the female component 514 of the joint in the main beam 462, a portion of the inside wall 512 and a portion of the upper surface 506 of the main beam 462 are removed. The female component 514 is of a predetermined width that is adapted to receive therein the cross beam. The cutout portion of the female component 514 that extends into the upper surface 506 of the beam 462 is selected so as to receive a portion of the cross beam 466 into the open box structure defined by the main beam 462. The cross beam 466 includes an upper surface 520, a lower surface 522, and a opposed side walls 524 and 526. The male portion 516 of the joint is formed in the cross member 466 defines an extending portion 528 of the main beam upper surface 520. This extending member 528 is defined by removing a portion of the opposed side walls 524 and 526 and a portion of the bottom 522 of the cross member 466.

The assembled joint is shown in FIG. 15 wherein the cross beam 466 is inserted into the notched area 514 of the main beam 462. The width 530 of the notch 514 is adapted to receive the cross beam therein in a close fitting relationship. The depth 532 of the notch 514 is adapted to provide a residual surface area between the terminating point of the notch 538 and the opposed side wall 510 of the beam 462 to provide a joining surface that compliments the inwardly facing surface 540 of member 528.

During assembly, the surface 540 in contact with the upper surface 506 of the main beam provides suitable mated area to effect joining as at J. Prior to the joining operation, the cross beam 466 is slidable relative to the main beam 462 in order to facilitate Y axis adjustment of the ladder frame structure. This joint also provides additional areas of joining between the side 512 of the main beam and the sides 524 and 526 and bottom portion 522 of the cross member 466. It is to be appreciated that any of the several cross members shown in FIG. 10 may incorporate the cross beam-main beam joint illustrated in FIGS. 14 and 15 at both ends of the cross member.

Having described the invention, what is claimed is:

1. A vehicle frame structure comprising a right side primary longitudinal member and a left side primary longitudinal member, at least two cross beams extending there between, defining in combination with said right and left side primary longitudinal members a ladder like frame having a forward portion and a rearward portion that correspond with the front and rear of a vehicle, right and left side rocker members supported in a spaced relationship with respect to said right and left side primary longitudinal members, wherein said primary longitudinal members have a forward end and an opposed rearward end, an upper surface and an opposed lower surface, and an inwardly facing surface and an opposed outwardly facing surface, and right side and left side rear beams, wherein said rear beams have a forward end and an opposed rearward end, an upper surface and an opposed lower surface, and an inwardly facing surface and an opposed outwardly facing surface, and a shoulder portion extending from each said inwardly facing and outwardly facing surface, a "C" node disposed between each said primary longitudinal member and its adjacent rocker member, said "C" node including opposed shoulder portions, which slidably engage said rear beam shoulder portions, such that each of said right and left side rear beams is in mechanical communication with its respective right and left side primary longitudinal member by means of said "C" node so as to extend aft of, and in an cantilevered fashion from, said ladder frame's rearward portion.

2. The vehicle frame structure according to claim 1 wherein one of said at least two cross beams extending between said left and right side primary longitudinal members extends past the right and left side primary longitudinal members and is attached at each end respectively to said right and left side rocker members.

3. The vehicle frame structure according to claim 1 wherein said "C" node is an extruded member.

4. The vehicle frame structure according to claim 1 wherein said rear beams are formed from extruded product.

5. The vehicle frame structure according to claim 1 further including an integral greenhouse structure which substantially defines a vehicle passenger compartment.

6. In a body-in-white space frame structure, a frame having a right side primary longitudinal member and a left side primary longitudinal member, at least two cross beams extending there between, defining in combination with said right and left side primary longitudinal members a ladder like frame having a forward portion and a rearward portion that correspond with the front and rear of a vehicle, right and left side rocker members supported in a spaced relationship with respect to said right and left side primary longitudinal members, wherein said primary longitudinal member has a forward end and an opposed rearward end, an upper surface and an opposed lower surface, and an inwardly facing surface and an opposed outwardly facing surface; the improvement wherein right side and left side rear beams each comprise an elongated member having a forward end and an opposed rearward end, an upper surface and an opposed lower surface, and an inwardly facing surface and an opposed outwardly facing surface, and a shoulder portion extending from each said inwardly facing and outwardly facing surface, each of said rear beams being in mechanical communication with its respective primary longitudinal member by means of a "C" node disposed between each said primary longitudinal member and its adjacent rocker member, said "C" node including opposed shoulder portions, which slidably engage said rear beam shoulder portions, wherein each said rear beam is disposed respectively between the right and left side rocker members and the ladder like frame, extending aft of, and in an cantilevered fashion from, said ladder frame rearward portion.

7. The body-in-white space frame structure according to claim 6 wherein one of said at least two cross beams extending between said left and right side primary longitudinal members extends past the right and left side primary longitudinal members and is attached at each end respectively to said right and left side rocker members.

8. The body-in-white space frame structure according to claim 6 wherein an additional cross member extends between and is fixedly attached to the cantilevered portions of said rear beams.

9. The body-in-white space frame structure according to claim 6 wherein the additional cross member extending between and fixedly attached to the cantilevered portions of said rear beams is attached to the lower surface of each of said rear beams.

10. The body-in-white space frame structure according to claim 6 wherein said rear beams are formed from extruded product.

* * * * *